United States Patent [19]

Glassmeyer

[11] 4,049,135
[45] Sept. 20, 1977

[54] CONTAINER HANDLING ARRANGEMENT WITH CHASSIS ADAPTER FRAME

[75] Inventor: John J. Glassmeyer, Covington, Ky.

[73] Assignee: Pullman Incorporated, Chicago, Ill.

[21] Appl. No.: 681,998

[22] Filed: Apr. 30, 1976

[51] Int. Cl.² .............................................. B65G 67/02
[52] U.S. Cl. ............................. 214/38 CC; 296/35 A; 214/38 D; 108/55.1
[58] Field of Search ........... 214/38 B, 38 BA, 38 CC, 214/38 D, 515, 84; 296/28 AL, 35 A; 108/55.1, 51.1; 105/366 R, 366 C, 366 E, 465

[56] References Cited

U.S. PATENT DOCUMENTS

| | | | |
|---|---|---|---|
| 3,111,341 | 11/1963 | Fujioka et al. | 296/35 A |
| 3,163,127 | 12/1964 | Gutridge et al. | 105/366 R |
| 3,260,223 | 7/1966 | Black et al. | 105/366 R |
| 3,317,236 | 5/1967 | Connerat et al. | 296/35 A |
| 3,454,172 | 7/1969 | Carr | 214/38 D |

FOREIGN PATENT DOCUMENTS 1,283,795   8/1972   United Kingdom .............. 296/35 A Primary Examiner—Robert G. Sheridan
Assistant Examiner—Lawrence E. Williams
Attorney, Agent, or Firm—Richard J. Myers

[57] ABSTRACT

An arrangement for handling containers particularly for aircraft includes a chassis adapter frame which is connected to the chassis of a highway trailer by means of twist locks. The adapter frame also includes twist lock assemblies which are adapted to engage the base of cargo containers whereby the adapter frame may be selectively removed from the container if desired. The arrangement includes loading and conveying arrangements which are particularly suited for transporting the container with the adapter frame connected thereto or with the same removed.

13 Claims, 10 Drawing Figures

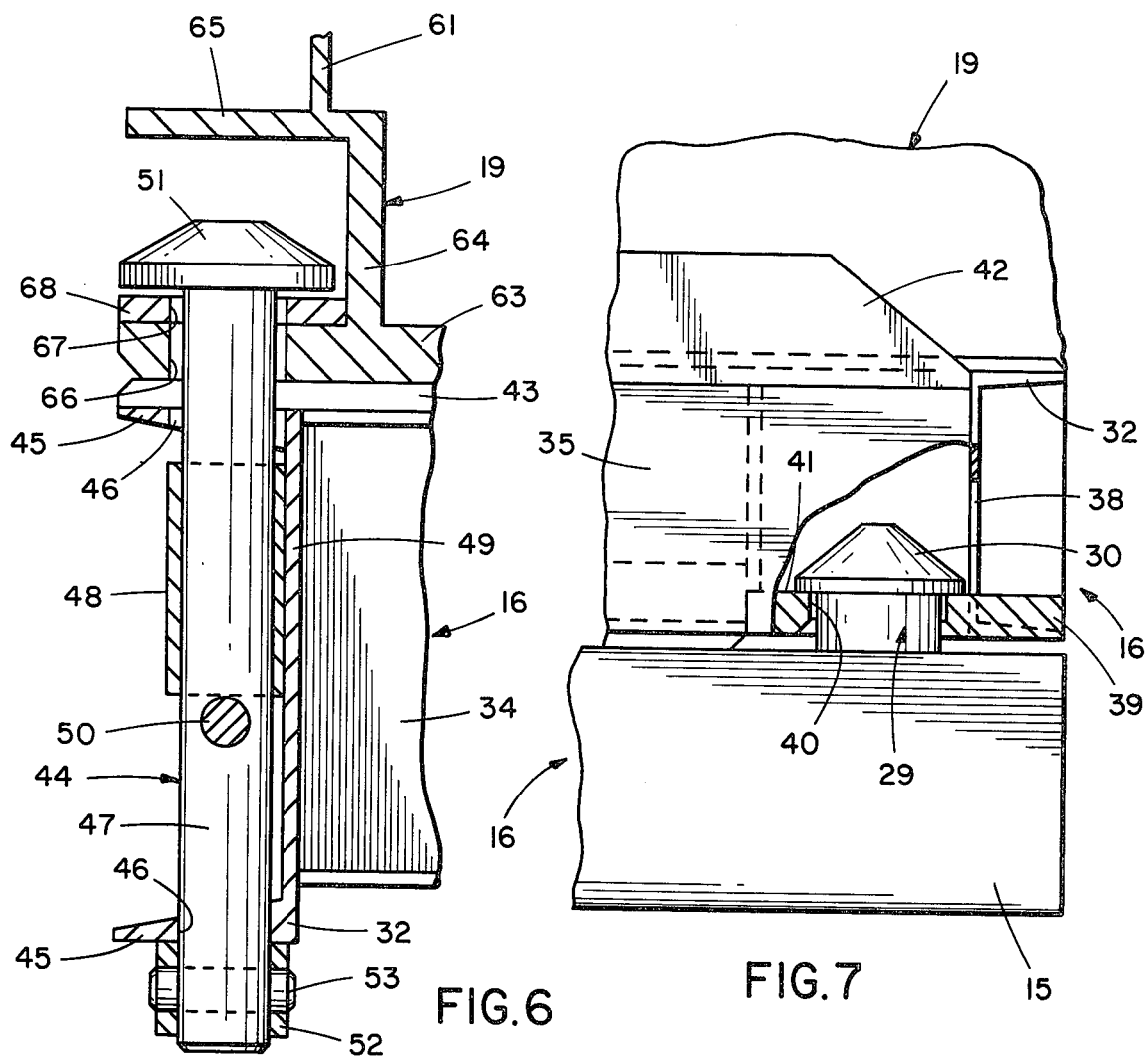
FIG. 6
FIG. 7
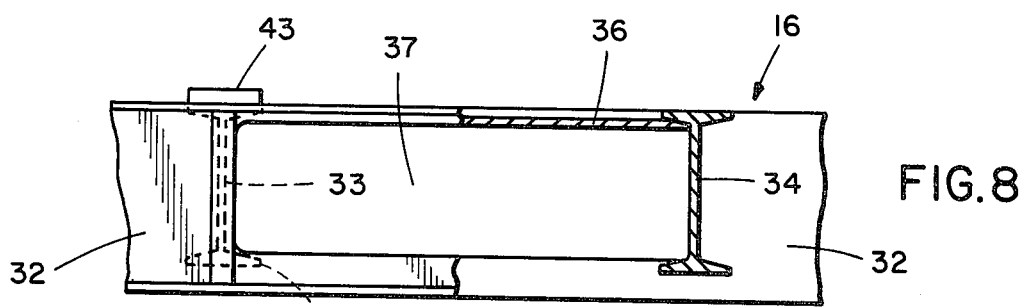
FIG. 8
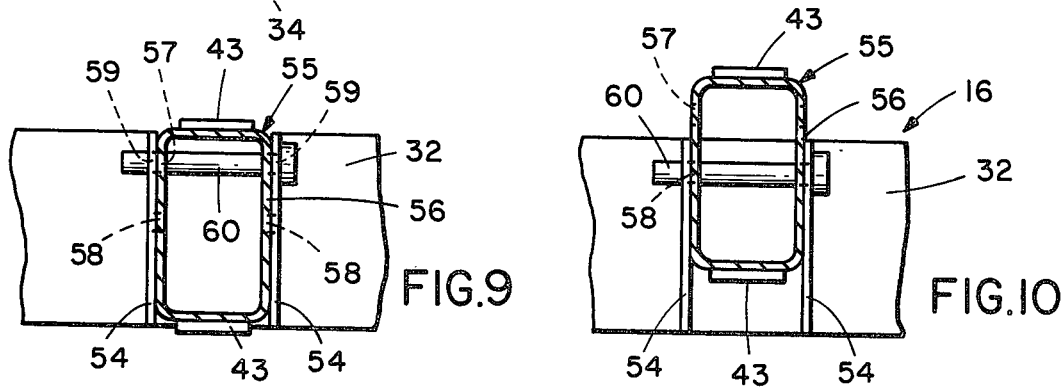
FIG. 9
FIG. 10

CONTAINER HANDLING ARRANGEMENT WITH CHASSIS ADAPTER FRAME

BACKGROUND OF THE INVENTION

1. Field of the Invention

The invention generally relates to container handling systems and more particularly relates to an adapter or transporter frame useable in a container handling system for transporting containers to aircraft cargo containers or the like.

2. Description of the Prior Art

The handling arrangement or systems of a type to which the present invention applies are shown in U.S. Pat. Nos. 3,506,144 Apr. 4, 1970 and 3,595,407 July 27, 1971 and more specifically to a chassis adapter or transporter having similar use and being shown in U.S. Pat. Nos. 3,480,174 Nov. 25, 1969 and 3,690,485 Sept. 12, 1972. The present arrangement and specific transporter frame is an improvement over the afore-mentioned prior art.

SUMMARY OF THE INVENTION

In the field of air cargo transportation small containers which have been contoured to roughly fit the shape of the aircraft fuselage have been in use for many years. However, recently airplanes have come into cargo service which have the large capability of transporting containers built to international standard dimensions. These have a rectangular box configuration of eight feet by eight feet by twenty feet. One of the important requirements for air cargo containers is that they must have a minimum tare-weight versus volume ratio. One of the ways this may be accomplished is to construct a container so that it is possible to leave the container underframe or base support structure on the ground when the container is loaded onto the airplane. The underframe is necessary when transporting the container by means of lift trucks or other loading devices but the same underframe is not necessary when the container is supported on the floor of an airplane. The present invention therefore pertains to an improved handling arrangement or system whereby containers and separable adapter or transporter frames are utilized in the transportation of the containers to the airplane but are selectively removed when the container itself is transported by means of roller conveyors into the interior of the fuselage of the plane. Generally the cargo container handling systems for aircraft include roller or ball conveyors. Generally stated the present disclosure anticipates either the side transfer of containers from the adapter frame directly to a power conveyor system or it contemplates the side transfer of the containers and the adapter frame onto a transfer device which will have power rollers for raising the containers vertically from the adapter frame and thereby conveying the same into the airplane. More specifically the present invention contemplates the use of a transporter or adapter frame of sufficiently strong structural construction the same being readily attached to the base of a container by means of twist lock assemblies. The adapter frame in turn also is attached with a container fastened thereto to a trailer chassis by means of the twist lock assemblies normally provided on such trailer chassis. The adapter frame thus is selectively removable from the container when desired and is particularly utilized in the transportation of the container to roller conveyors by side transfer movement. The transporter or adapter frame includes slide pads or rollers so that it may be utilized for transferring a container onto a roller conveyor for further transportation. The adapter also is particularly useful for supporting either large or relatively smaller containers the frame being provided with a divider arrangement which may be raised to separate the containers on the transporter or adapter frame. The present arrangement therefore is particularly intended to permit the selective removal or attachment of the frame to the base of a container and thereby permit transportation of the container with the frame attached or it maybe removed as desired to facilitate various handling techniques which may be employed. The handling arrangement envisions the utilization of roller conveyers, and side loading devices to which the present novel transporter frame is particularly adapted.

BRIEF DESCRIPTION OF THE DRAWINGS

FIG. 6 is a cross sectional view taken along the line 6—6 of FIG. 5;

FIG. 7 is an elevational view partially in section taken aling the line 7—7 of FIG. 5;

FIG. 8 is an elevational view partially in cross section taken along the line 8—8 of FIG. 3;

FIG. 9 is a cross sectional veiw taken substantially along the line 9—9 of FIG. 3; and FIG. 10 is a view similar to FIG. 9 showing another position of a divider beam.

DESCRIPTION OF THE PREFERRED EMBODIMENT

Figure 1:
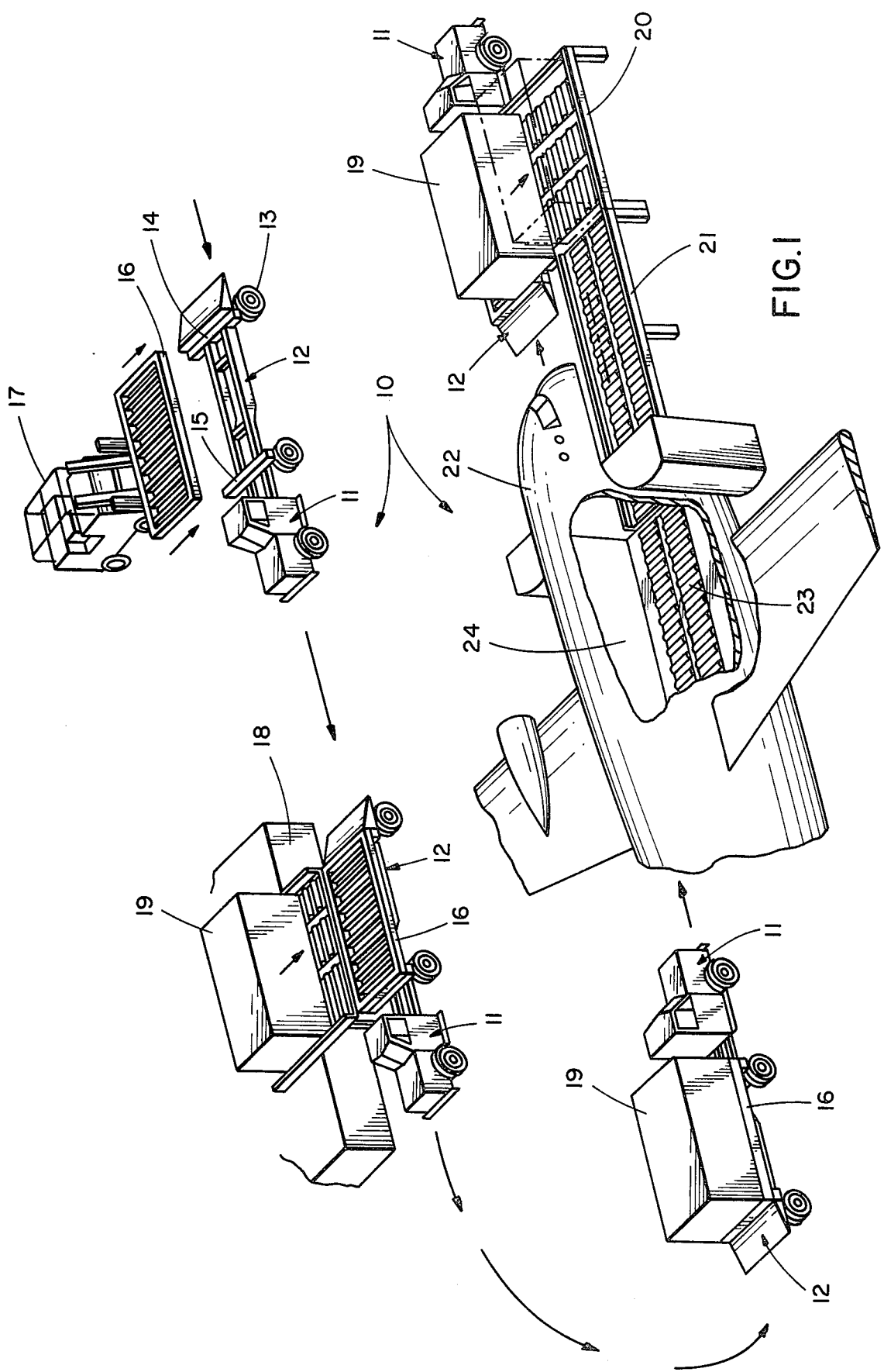
FIG. 1 is a schematic view in perspective showing a container handling arrangement including an improved adapter frame for containers.
Figure 2:
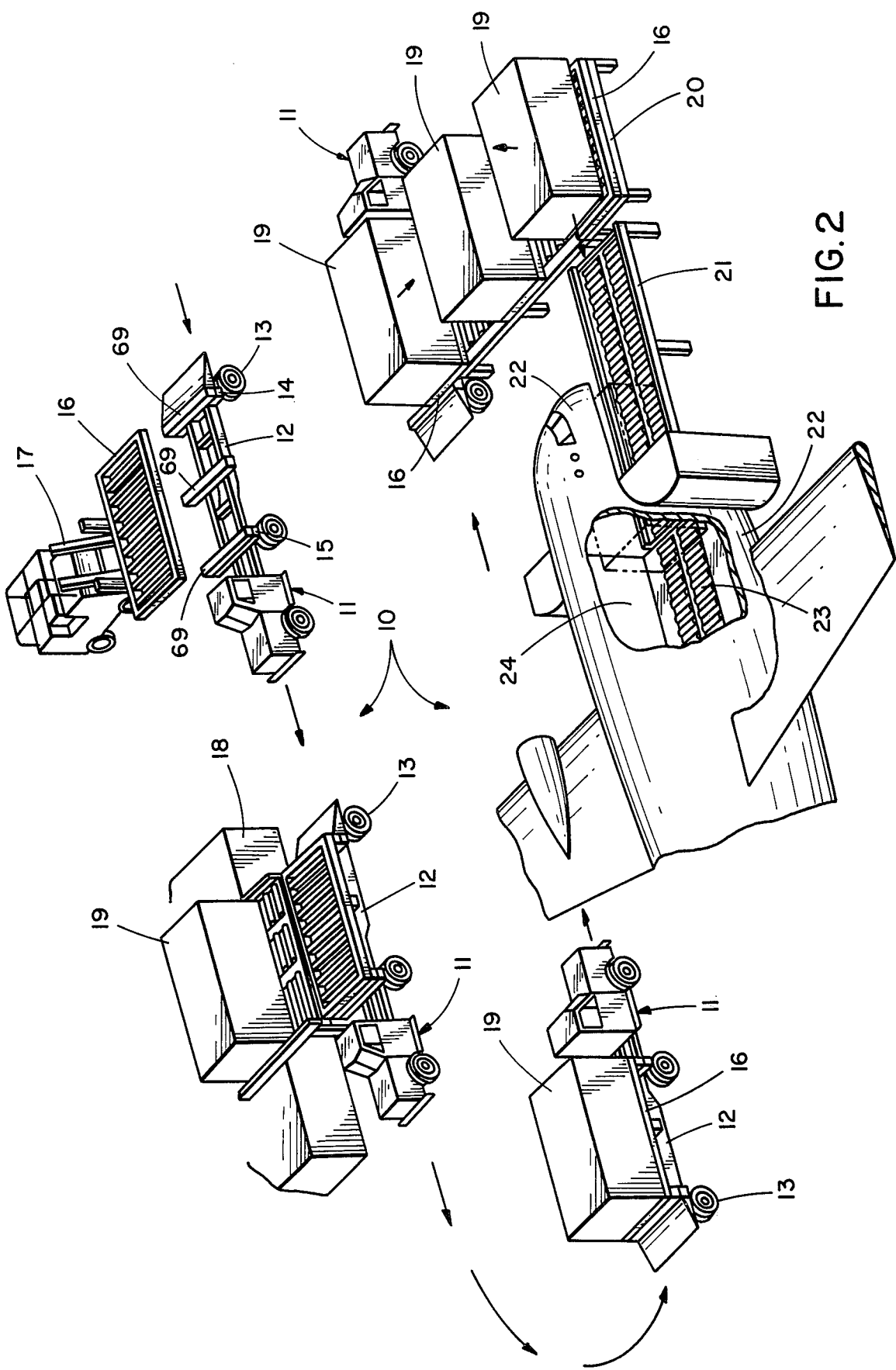
FIG. 2 is a view similar to FIG. 1 showing another form of handling systems wherein a container and adapter frame are moved in unison.

Referring now particularly to FIGS. 1 and 2, a container handling arrangement 10, includes an over-the-highway tractor 11, having connected thereto a conventional trailer chassis 12, supported on a conventional rear suspension 13. The trailer chassis 12, includes rear and front transfer bolsters respectively 14 and 15, which are adapted to support a chassis adapter or transporter frame generally designated at 16. FIGS. 1 and 2 disclose a conventional fork lift truck 17, a loading roller conveyer arrangement 18, adapted to load a container 19, onto a trailer chassis 12, having supported thereon the transporter frame 16. A receiving roller conveyor 20, is adapted to move the container 19, onto a transversely extending roller conveyor 21, in turn for loading the container 19, onto a transport vehicle 22, which in this case is an airplane of the cargo carrying type. The interior fuselage 24 of the airplane 22, is also provided with a suitable internal roller conveyor 23, and is open at its forward end for loading a container 19, by means of the roller conveyors 21 and 23.

Figure 3:
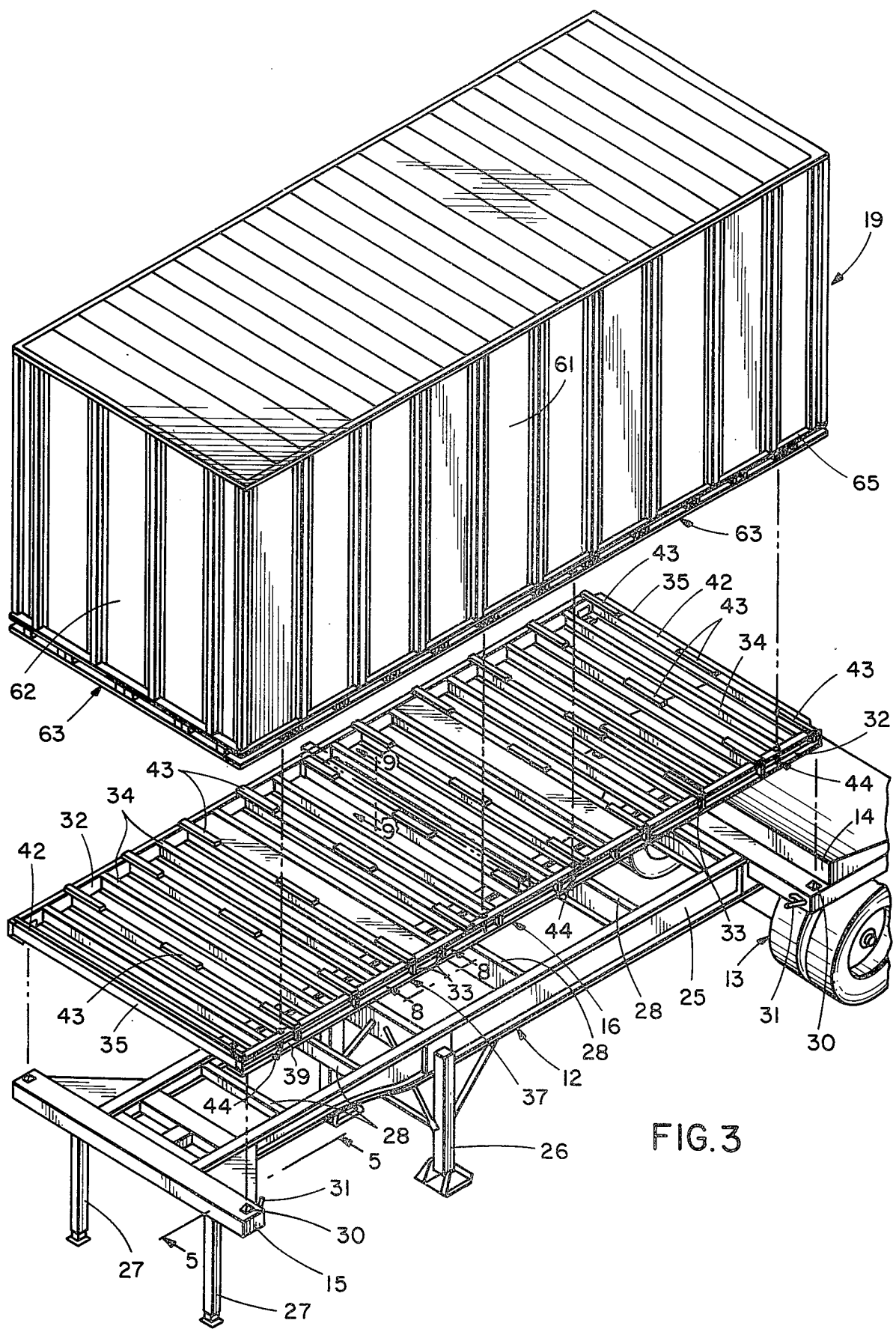
FIG. 3 is an exploded perspective view of a chassis frame, a transporter or adapter frame, and an air freight container adapted to be carried thereon.
Figure 4:
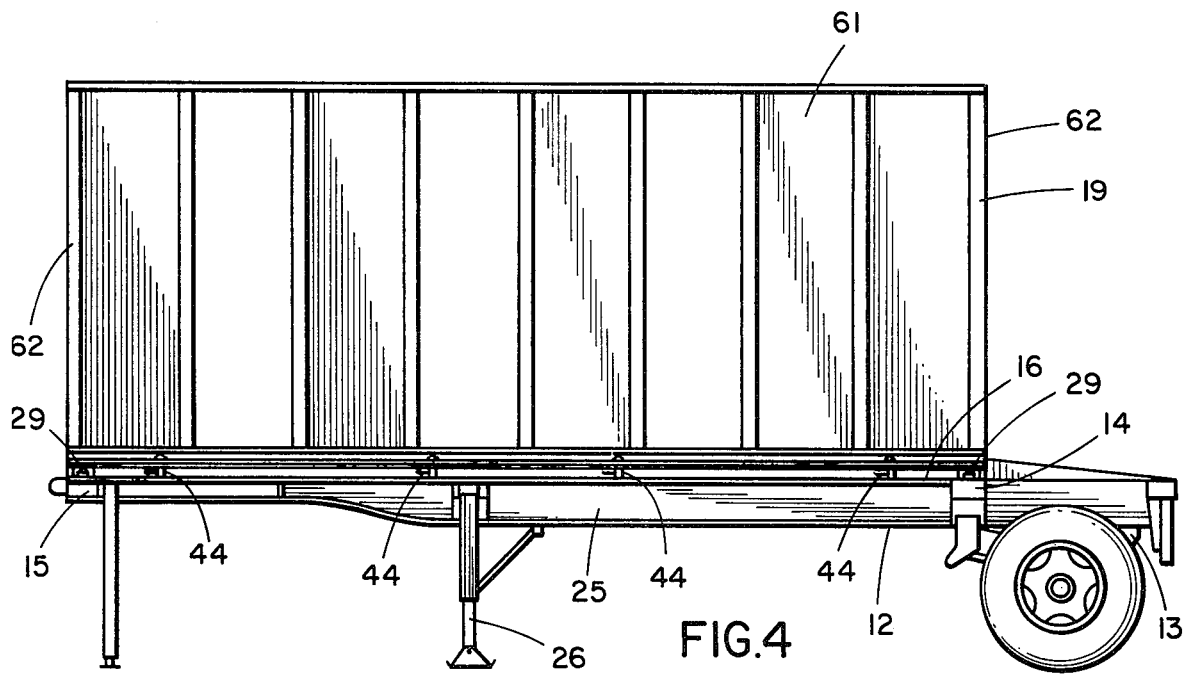
FIG. 4 is a side elevational view of a trailer chassis, adapter frame and container carried thereon.
Figure 5:
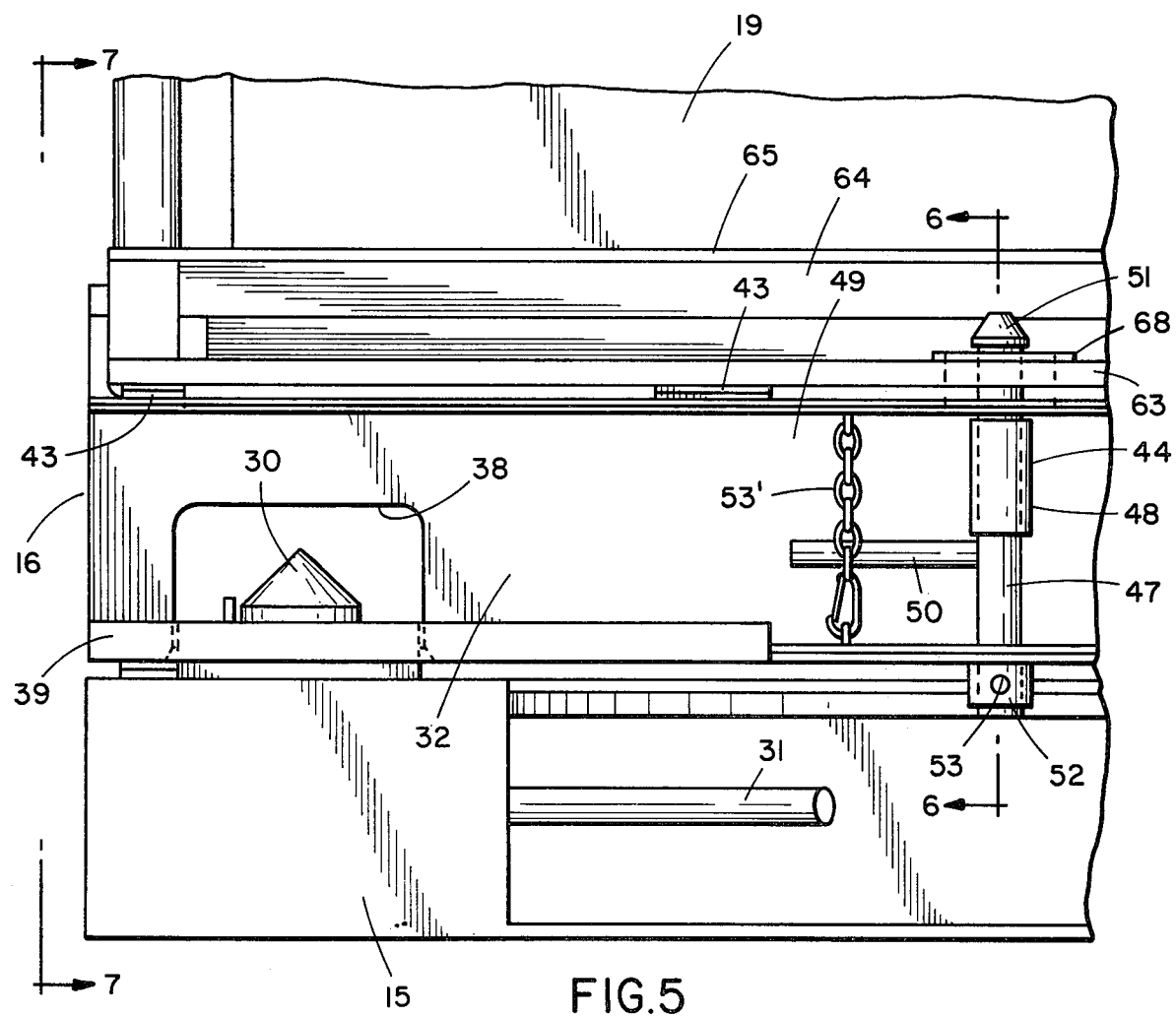
FIG. 5 is a side elevational view of a portion of a trailer chassis, adapter frame, and container taken particularly along the line 5—5 of FIG. 3.

Referring now specifically to FIGS. 3, 4 and 5 the chassis 12, comprises a pair of horizontally spaced longitudinally extending frame members 25, suitably supported on the ground by a conventional landing gear structure 26. The chassis also is further supported by means of auxiliary hinged foldable front legs 27, connected to the front bolster 15. The longitudinal frame members 25, are also inter-connected by transversely extending frame members 28. Each of the bolsters 14 and 15, are provided at opposite ends thereof with first twist lock assemblies 29, of conventional design. Each assembly 29, comprises a conical lock head 30, adapted to be suitably rotated from lock and unlocked positions by means of a handle 31.

Referring now specifically to FIGS. 3 and 6 to 10, the transporter frame 16, comprises a pair of channel shaped longitudinally extending side frame members 32, suitably reinforced by horizontally spaced vertically extending gussets 33. Transversely extending I-beam members 34, which are longitudinally spaced connect the side frame members 32. Transversely extending end frame members 35, are connected to the opposite ends of the side frame members 32. As best shown in FIG. 8, the transporter frame 16, is provided with four openings 37, adapted to receive the forks of the lift truck when the latter is utilized for moving the transporter frame. Top plates 36, connected to the I-beams 34, provide a closure means for the openings 37, which are engaged by the forks of a lift truck.

As best shown in FIG. 7 the transporter frame 16, is attached to the transverse bolsters 14 and 15, by means of the four twist lock assemblies 29. Opposite ends of the channel shaped side frame members 32, are provided -with cut-outs 38, and in the region of said cut-outs the lower flange of the frame members 32, are provided with reinforcing plate 39. The reinforcing plates 39, are also suitably connected to the lower edges of the end frame members 35, and are provided with vertical openings 40, which terminate in locking seats 41, provided in the upper surface of the plate 39. As best shown in FIG. 7, the conical head 30, is in locked engagement with the locking seat 41, when the transporter frame is attached in four places to the rear and front bolsters 14 and 15 respectively. As best shown in FIGS. 3 and 7, the end frame members 35, are also provided with upwardly inclined retaining flanges 42.

The transporter frame 16, is also provided with a plurality of slide plates 43, secured to the top and bottom I-beam members 34. As best shown in FIGS. 4, 5 and 6, second twist lock assemblies 44, are suitably connected to the channel shape side frame members 32. Four of such assemblies are provided. The channel members 32, include upwardly projecting flanges 45, the upper of said flanges being provided with vertical apertures 46, as best shown in FIG. 6. Each second twist lock assemblies 44, includes a vertical shaft 47, disposed in the upper opening 46, and extending down through the lower flange 45, also provided with a similar opening 46. The shaft 47 is further supported for rotation within a vertical sleeve 48, suitably connected to the wall 49, of the frame member 32. The shaft has connected thereto a handle 50, for rotating the same in locking and unlocking relation. The shaft 47 is provided at its upper end with a conical twist lock head 51. The shaft also has connected at its lower end a stop collar 52, pinned to the lower end of the shaft 47, by means of a pin 53. The head 51, may be rotated and lowered to a position where it is recessed in the upper opening 46. The shaft is limited in its vertical movement by means of the stop collar 52. As best shown in FIG. 5, a suitable chain and latch arrangement 53', is connected to the flanges 45, to retain the handle 50, against movement when the twist lock heads 51, are in their engaging or locking position.

As best shown in FIGS. 9 and 10, the transporter frame 16, also is provided with a pair of centrally disposed and transversely extending guide members 54, connected at their opposite ends to the channel shape side frame members 32. A divider beam generally designated at 55, includes a rectangular tubular member 56, which is disposed in vertical sliding relation with respect to the transverse guide members 54. Each divider beam 55, includes upper and lower aligned openings 57 and 58, which during vertical movement of the divider beam 55 are adapted to be placed selectively into aligned relation with respect to openings 59, provided in the tubular member 56. The divider beam may be placed in the position indicated in FIG. 9, wherein the slide plates 43, carried on the upper and lower ends of the divider beam 55, are in the same horizontal plane as the other slider plates 43. In this case the transporter frame may be used to support one large size container 19. In the event that two smaller containers are placed on the transporter frame, the divider beam 55, is moved upwardly to the position shown in FIG. 10 wherein it projects upwardly and separates the containers. A locking pin 60, is inserted to keep the beam 55 in either of the positions shown in FIGS. 9 and 10.

As best shown in FIGS. 3 and 4 the container 19, comprises vertical side walls 61, connected by end walls 62. The lower portion of the container 19, is provided with a base 63, having as indicated in FIG. 6, an upwardly extending wall portion 64, provided with a longitudinally outwardly extending flange 65, which with the base 63, provides a channel type of arrangement. The side walls 61, are connected at their lower ends to the flange 65, and project upwardly with respect thereto. The outer ends of the base 63, are provided with four apertures 66, adapted to be placed into alignment with the twist lock assemblies as indicated in FIG. 6. An aligned locking opening 67, is provided in each of pads 68 rigidly secured to the base 63. As indicated in FIG. 6, the locking head 51, is in locked position relative to the base of the containers 63 and the container thus can be rigidly and releaseably secured to the transporter frames 16.

OPERATION

As previously indicated the present invention is particularly concerned with containers of a type which are built for air transport. Containers of this type must have a minimum tare weight to volume ratio. This is accomplished by providing the separate transporter frame, when the container is moved to its various vehicles and conveyers and ultimately to the aircraft fuselage. Thus the transporter frame forms a strong floor support for the base in turn supporting the container when it is loaded. It is particularly desirable to provide such a transporter frame when lift trucks are used for loading cargo such as the case when the container is loaded onto a trailer chassis, etc. The present adapter or transporter frame is effective to be rigidly and removably connected to the base of the container and in turn may be suitably connected to the trailer chassis. Thus the present adapter frame may be utilized in side loading of the containers or it may be used with power conveyers systems which are disclosed in FIGS. 1 and 2. The transporter frame also is utilized with conveyers having elevated power roller devices which may raise the containers vertically from the adapter frame and move them into the airplane. Such structures and transfer devices are found in the prior art.

Referring now particularly to FIG. 1, it is schematically shown that the lift truck 17, is adapted to place the transporter or adapter frame 16, onto the bolsters 14 and 15, of the chassis 12, whereupon the transporter frame is then locked in position by means of the twist lock assemblies 29. The tractor 11 and trailer chassis 12 with the transporter frame thereon are then moved to the conveyor roller arrangement 18, and the container 19 may then be moved side-ways on top of the adapter frame 16. The container 19, is then secured to the adapter frame 16, by means of the second twist lock assemblies 44. The trailer chassis 12, with the container 19, loaded thereon is now moved to a receiving conveyor of the power roller type 20, whereupon the container is then moved side ways by any suitable means from the adapter frame 16, onto the conveyor 20. The transverse roller conveyer 21, which is provided with powered rollers now moves the container 19 onto the roller conveyer 23, into the interior of the fuselage of the airplane 22.

FIG. 2 shows essentially a similar system arrangement except that when the highway tractor 11 and trailer chassis 12 have been moved adjacent to the conveyer 20, and the container is then moved onto the conveyer 20 the transporter frame remains attached to the container 19. As indicated in FIG. 2, when the chassis 12 has arrived at the roller conveyer 20, vertical lift bolsters 69, are placed in operation which in turn raises the adapter frame 16, with the container carried thereon to the level of the rollers on the conveyor 20, whereupon the container and adapter frame are moved sideways, by suitable pusher means of conventional design, onto the conveyor 20. When the container and adapter frame reach the position wherein the container is in alignment with the transverse conveyor 21, the second twist lock assemblies are disengaged from the container 19 and the container 19 may be moved by suitable means to the power roller conveyor 21, with the adapter frame 16, remaining on the conveyor 20 for return to the chassis.

The adapter frame is provided with the slide plates 43 or rollers, both on the upper and lower portions of the cross members and therefore the same may be used on both sides thereof for supporting the container 19. When smaller containers are to be transported the divider member 55, which also is provided with slide plates 43, is adjusted to the position shown in FIG. 10 where it provides separater or divider means between the pair of smaller containers.

The foregoing description and drawings are given merely to explain and illustrate the invention, and the invention is not to be limited thereto, since those skilled in the art who have the disclosure before them will be able to make modifications and variations therein without departing from the scope of the invention.

What is claimed is:

1. A container handling arrangement comprising a vehicle having a container-carrying chassis including longitudinally extending laterally spaced side rails and transversely extending longitudinally spaced front and rear bolsters, first twist lock assemblies positioned at opposite ends of said bolsters, a transporter frame having longitudinally extending and laterally spaced side frame members, a plurality of longitudinally spaced and transversely extending frame member connecting said side frame members, twist lock socket members positioned at the corner ends of said frames adapted to be engaged by said twist locks for releasably connecting said frame to said chassis, a cargo container having a lower base including longitudinally extending laterally spaced side members having longitudinally spaced vertical twist lock receiving apertures, second twist lock assemblies on said transporter frame adapted to engage said twist lock receiving apertures for releaseably connecting said container on said frame, and means for moving said transporter frame and said container to and from said container-carrying chassis, said first twist lock assemblies being releaseable from twist lock socket members whereby said frame and a container carried therein are removable in connected relation from said chassis, and said second twist lock assemblies being selectively releaseable from said container whereby said container is released from said frame, with said frame remaining in connected relation with said chassis by means of said first twist lock assemblies, said transversely extending frame member of said transporter frame including upper and lower bearing pads projecting above and below said side frame members.

2. The invention in accordance with claim 1, said transporter frame including a transversely extending divider beam disposed between opposite ends of said frame.

3. The invention in accordance with claim 2, said divider beam being vertically movable to a raised position above said transversely extending frame member for separating a pair of containers carried on said frame.

4. The invention in accordance with claim 2, including a pair of laterally extending and longitudinally spaced guide members connected to said side frame members for slidably guiding said divider beam for vertical movement, and means releaseably locking said divider beam in either said raised or lowered position.

5. A container handling arrangement comprising a vehicle having a container-carrying chassis including longitudinally extending laterally spaced side rails and transversely extending longitudinally spaced front and rear bolsters, first twist lock assemblies positioned at opposite ends of said bolsters, a transporter frame having longitudinally extending and laterally spaced side frame members, a plurality of longitudinally spaced and transversely extending frame member connecting said side frame members, twist lock socket members positioned at the corner ends of said frames adapted to be engaged by said twist locks for releasably connecting said frame to said chassis, a cargo container having a lower base including longitudinally extending laterally spaced side members having longitudinally spaced vertical twist lock receiving apertures, second twist lock assemblies on said transporter frame adapted to engage said twist lock receiving apertures for releaseable connecting said container on said frame, and means for moving said transport frame and said container to and from said container-carrying chassis, said first twist lock assemblies being releasable from twist lock socket members whereby said frame and a container carried therein are removable in connected relation from said chassis, and said second twist lock assemblies being selectively releasable from said container whereby said container is released from said frame, with said frame remaining in connected relation with said chassis by means of said first twist lock assemblies, said transversely extending frame members of said transporter frame being adapter to slidably support a container carried therein for discharge therefrom in the direction of extension of said frame members.

6. The invention in accordance with claim 1,
said means for moving said container comprising a conveyor adapted to be positioned laterally to one side of said chassis.

7. The invention in accordance with claim 1,
said means for moving said transporter frame including lifting means.

8. The invention in accordance with claim 1,
including conveying means for moving said transporter frame and a container carried thereon to a transport vehicle.

9. The invention in accordance with claim 1,
including conveying means for moving a container from said chassis to a transport vehicle.

10. For a cargo container having a light-weight wall structure which is susceptible to destruction during conventional transshipment handling such as upon a highway vehicular chassis;

a temporary transporter frame cradling the container and providing an underframe therefor, first locking means for releasably securing said transporter frame to said wall structure of the container in supportive rigidfying relation, second locking means adapted for releasably securing said transporter frame to the vehicular chassis, and means on said transporter frame interposed between the same and said cargo container providing limited slide surface areas to facilitate removal of said container off said transporter frame for deposit upon an adjacent limited load-carrying cargo transport adapted to receive and adequately support said container and cargo therein without said transporter frame.

11. The invention according to claim 10, and
said means comprising slide pads on said transporter frame raised above the top plane thereof.

12. The invention according to claim 10, and
means for sub-dividing said transporter frame extendable upwardly above the top thereof for engagement with adjacent ends of plural cargo containers mounted thereon.

13. The invention according to claim 12, and
said means for sub-dividing said transporter frame comprising a frame member extending intermediate side portions of said transporter frame, and means on the frame member and transporter frame for locking the same together in a plurality of relatively vertically displaced positions.

* * * * *